(12) United States Patent
Podesta et al.

(10) Patent No.: US 7,570,265 B2
(45) Date of Patent: *Aug. 4, 2009

(54) SAWTOOTH SPLINE DISPLAY

(75) Inventors: Robert G. Podesta, Oakland, CA (US); Scott P. Clark, San Francisco, CA (US); Christopher R. Schoeneman, Berkeley, CA (US); Timothy S. Milliron, Bekerkey, CA (US)

(73) Assignee: Pixar, Emeryville, CA (US)

( * ) Notice: Subject to any disclaimer, the term of this patent is extended or adjusted under 35 U.S.C. 154(b) by 69 days.

This patent is subject to a terminal disclaimer.

(21) Appl. No.: 11/542,684

(22) Filed: Oct. 2, 2006

(65) Prior Publication Data
US 2007/0076003 A1 Apr. 5, 2007

Related U.S. Application Data

(63) Continuation of application No. 10/783,797, filed on Feb. 20, 2004, now Pat. No. 7,129,950.

(51) Int. Cl.
*G06T 13/00* (2006.01)
*G06T 11/20* (2006.01)

(52) U.S. Cl. .................. 345/474; 345/440; 345/442

(58) Field of Classification Search ............... 345/959
See application file for complete search history.

(56) References Cited

U.S. PATENT DOCUMENTS

| 5,317,682 | A | * | 5/1994 | Luken, Jr. ............ 345/442 |
| 6,115,051 | A | * | 9/2000 | Simons et al. ........ 345/442 |
| 6,782,306 | B2 | * | 8/2004 | Yutkowitz ............ 700/189 |
| 6,952,209 | B2 | * | 10/2005 | Ericsson et al. ........ 345/440 |
| 6,989,848 | B2 | * | 1/2006 | Lipsky et al. .......... 345/671 |
| 7,369,127 | B1 | * | 5/2008 | Hull .................... 345/440 |

OTHER PUBLICATIONS

Ron Person, "Special Edition Using Microsoft Excel 97" [online], Dec. 17, 1996, Chapter 17, Proquest [retrieved on Mar. 1, 2008]. Retrieved from <URL:http://proquest.safaribooksonline.com/0789709600>.*

\* cited by examiner

*Primary Examiner*—Xiao M Wu
*Assistant Examiner*—Jason M Repko
(74) *Attorney, Agent, or Firm*—Townsend and Townsend and Crew LLP

(57) ABSTRACT

A computer-implemented method for displaying animation splines includes receiving a source spline formed of paths between a sequence of knots to define a path between a first and a second end knot, where the knots are mapped to first second axes, identifying one or more pose knots and one or more timing knots between the first and the second end knot, thereafter producing a modified spline wherein second axes through at least one of the one or more pose knots are reversed, and displaying the modified spline evaluation and to allow adjustment of the source spline.

23 Claims, 2 Drawing Sheets

SAWTOOTH SPLINE DISPLAY

CROSS-REFERENCES TO RELATED APPLICATIONS

This application is a continuation of U.S. patent application Ser. No. 10/783,797, entitled "Sawtooth Spline Display", filed on Feb. 20, 2004, which is hereby expressly incorporated by reference for all purposes.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

This invention relates to computer animation and more particularly to the use and display of an animation spline, namely the mathematically defined curve in distance and time that is used to produce a smooth path between successive points or key frames in an animation sequence. This invention addresses the problem of intuitively assessing and controlling ease in and ease out for key frames in an animation scene (also known as "slow in and out"). This invention is particularly relevant for monotonically increasing curves, such as those used to control the timing of other animation splines.

With the wide-spread availability of computers, film animators increasingly rely upon computers to assist in the animation process. This process includes using computers to facilitate drawing-based animation, for example, by painting images, by generating in-between images ("tweening"), and the like. This process also includes using computers to augment physical animation techniques. For example, physical models could be represented by virtual models in computer memory, and then the virtual models could be manipulated.

As one of the pioneering companies in the computer aided animation (CAA), Pixar of Emeryville, Calif., has developed computing platforms especially designed for CAA, animation software, and rendering software now known as RENDERMAN®. While RENDERMAN® computer animation/rendering software was focused upon rendering, namely the creation of images from geometric models, the animation software developed for in-house use had focused upon allowing animators to specify ("animate") the geometric models. The geometric models typically represent objects in a scene, characters in a scene, positions of objects and characters, manipulation of objects and characters, lighting, textures, and the like.

In the process of preparing a fully animated scene, animation splines are provided in display form to guide the animator in making dynamic changes between key frames. Animation splines are typically drawn against a constant distance axis relative to a time axis, typically a vertical axis. As such, an ease in/out effect for a monotonically increasing section takes on an S-curve shape through the knot. This S-curve is non-symmetrical about the vertical axis, making it more difficult for the animator to observe differences between the in and out sections, and as such it is also not especially intuitive to an animator. A further disadvantage of this approach is that splines that represent monotonically increasing quantities over an extended time period require a large amount of vertical space to display fully.

What is needed is a mechanism for enhancing the usefulness of animation splines.

SUMMARY OF THE INVENTION

According to the invention, in a computer aided animation system where an animation spline is produced from a sequence of knots, the display of the animation spline is modified so that the vertical axis of the curve is flipped at selected 'pose' knots in order to allow ready evaluation, typically by visual inspection, of the perception effect of the spline.

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DESCRIPTION OF SPECIFIC EMBODIMENTS OF THE INVENTION

Figure 1:
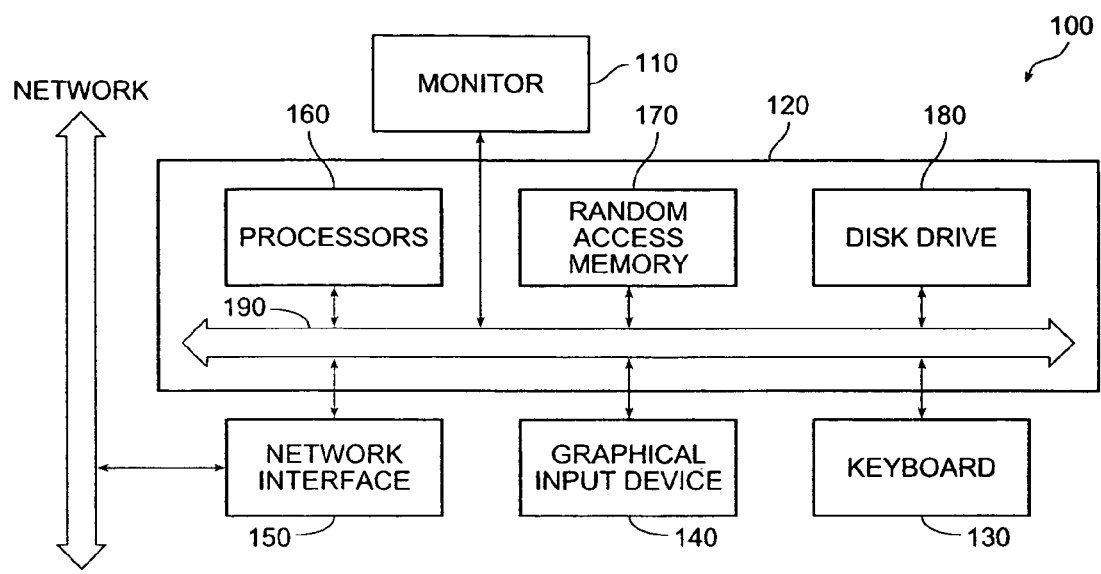
FIG. 1 is a block diagram of an animation system according to one embodiment of the present invention.

FIG. 1 is a block diagram of typical computer rendering system 100 according to an embodiment of the present invention.

In the present embodiment, computer system 100 typically includes a monitor 110, computer 120, a keyboard 130, a user input device 140, a network interface 150, and the like.

In the present embodiment, user input device 140 is typically embodied as a computer mouse, a trackball, a track pad, wireless remote, and the like. User input device 140 typically allows a user to select objects, icons, text and the like that are to appear on the monitor 110. In the present invention, an active spline is displayed as a two dimensional graph on the monitor 110 as hereinafter explained.

Embodiments of network interface 150 typically include an Ethernet card, a modem (telephone, satellite, cable, ISDN), (asynchronous) digital subscriber line (DSL) unit, and the like. The network interface 150 is typically coupled to a computer network. In other embodiments, the network interface 150 may be physically integrated on the motherboard of computer 120, may be a software program, such as soft DSL, or the like.

The computer 120 typically includes components such as a processor 160, and memory storage devices, such as a random access memory (RAM) 170, disk drives 180, and a system bus 190 interconnecting the above components.

In one embodiment, the computer 120 is a PC compatible computer having one or more microprocessors such as XEON™ microprocessor from Intel Corporation. Further, in the present embodiment, the computer 120 may include a UNIX-based operating system.

RAM 170 and disk drive 180 are examples of tangible media for storage of data, audio/video files, computer programs, applet interpreters or compilers, virtual machines, embodiments of the herein described invention including an animation engine, geometric description of objects, characters, object data files, character rigging, shader descriptors, a rendering engine, output image files, texture maps, displacement maps, scattering lengths and absorption data of object materials, a spline description, and the like. Other types of tangible media include magnetic disks such as floppy disks and ZIP® disks, removable hard disks, optical storage media such as CD-ROMS and bar codes, semiconductor memories such as flash memories, read-only-memories (ROM), battery-backed volatile memories, networked storage devices, and the like.

In the present embodiment, computer system 100 may also include software that enables communication via a network such as according to HTTP, TCP/IP, RTP/RTSP protocols, and the like in order to communicate information during the work process as well as communicate a final product for storage and production. In alternative embodiments of the present invention, other communication software and transfer protocols may also be used, for example IPX, UDP or the like.

FIG. 1 is representative of computer animation systems capable of embodying the present invention. It will be readily apparent to one of ordinary skill in the art that many other hardware and software configurations are suitable for use with the present invention. For example, the use of other micro processors are contemplated, such as PENTIUM™ microprocessor or ITANIUM™ microprocessors; OPTERON™ or ATHLONXP™ microprocessors from Advanced Micro Devices, Inc; POWERPC G3™, G4™ microprocessors from Motorola, Inc.; and the like. Further, other types of operating systems are contemplated, such as WINDOWS® operating system such as WINDOWSXP® operating system, WINDOWSNT® operating system, or the like from Microsoft Corporation, SOLARIS operating system from Sun Microsystems, LINUX, UNIX, MAC OS and other operating systems from Apple Computer Corporation, and the like.

Figure 4:
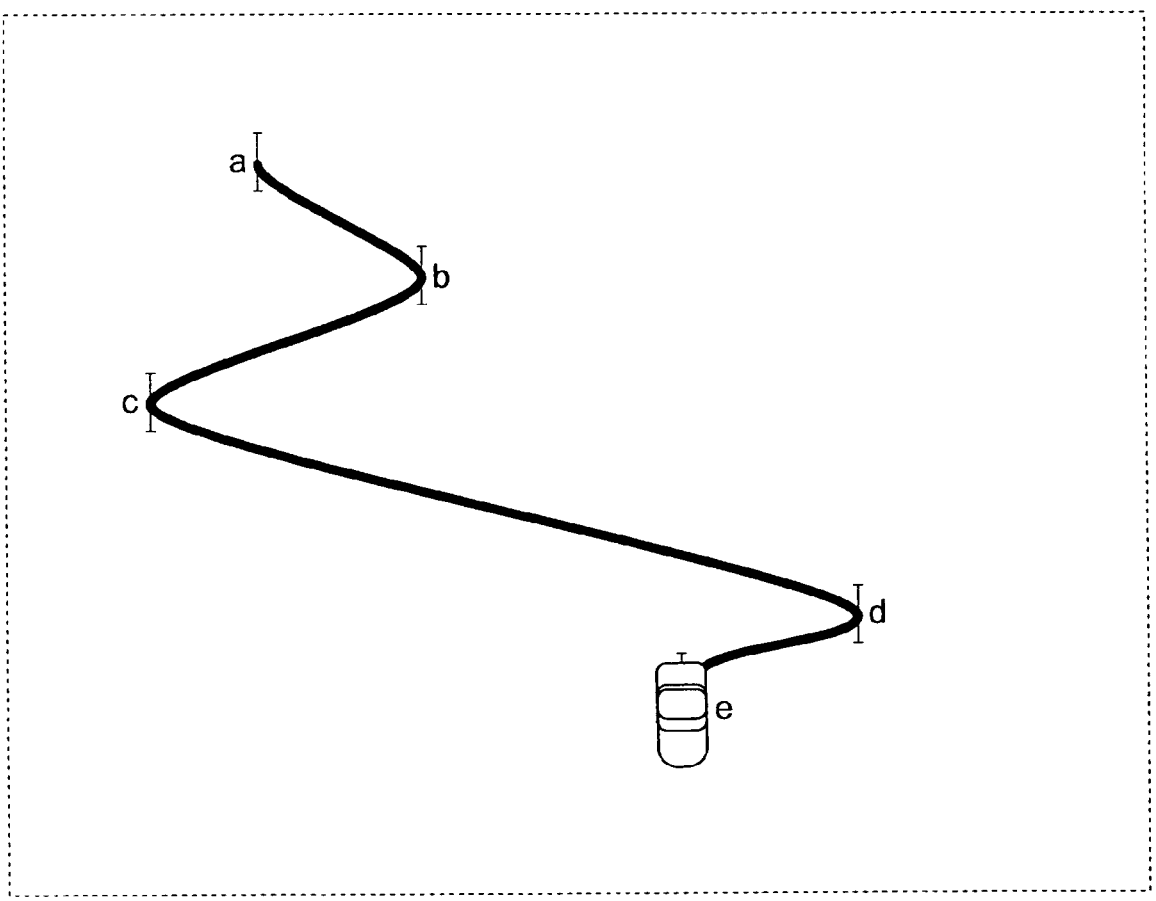
FIG. 4 is a representation of an animation sequence, such as a vehicle along a path, from which a spline is constructed, using pose knots.

Referring to FIG. 4, an animation sequence is illustrated. A vehicle at position or pose knot "e" has traversed a path from position "a" through positions "b," "c" and "d," called poses, the mathematically equivalent nodes of the poses being called pose knots, along a segmented path. The distance between the poses in split, namely the sequence illustrated, is reflected in the distance between the knots in split. The greater the distance between the poses along the path, the greater will be the vertical separation between the pose knots when viewed graphically as a spline.

In embodiments of the present invention, the sawtooth spline and modifications to objects are implemented by the computer-aided animation system by producing a spline between points "a" through "e" and displaying the spline on the display monitor 110 to the animator for evaluation. There are two ways an animator can evaluate the spline: the conventional technique wherein an ascending view of the spline is produced and displayed such that every successive pose knot is further along the distance scale as time is advanced, and a sawtooth mode wherein alternating pose knots are displayed with the vertical (distance) axis flipped. The animator thus has access to both the display of FIG. 2 and of FIG. 3 for an animation of FIG. 4 to adjust the spline trajectory through knots b, c and d, so that distinctions can be noted, and a smoother spline curve can be constructed for the animation sequence. The animator has the latitude of moving the pose knots in time. The bidirectional arrows of FIG. 4 correspond to bidirectional arrows at respective pose knot positions for FIGS. 2 and 3.

Figure 2:
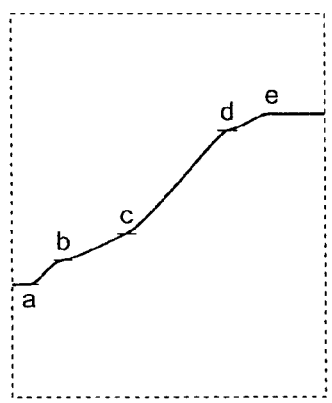
FIG. 2 is a representation of an a pose spline in the ascending or unflipped mode.
Figure 3:
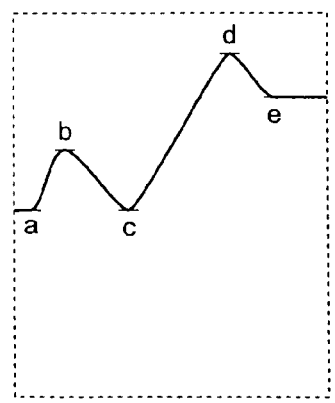
FIG. 3 is a representation of the pose spline of FIG. 2 in the sawtooth or flipped mode.

According to the invention, a flexible method for successively flipping the vertical (distance) axis of an animation spline is provided. Referring to FIG. 3, the flipped mode of the spline of FIG. 2 is illustrated wherein the vertical (distance) axis is locally flipped through alternating knots. The visual effect is an exaggeration of anomalies in the curve as segments successively alternate direction reminiscent of a sawtooth waveform. Hence it is called a sawtooth spline.

This technique is particularly useful for managing splines that control timing of other curves. For example, the animator can adjust selected splines in time (left and right in FIGS. 2 and 3) without impacting distance. The actual values of the knots are not affected. It is recognized that it may not be desirous to flip every successive knot in a spline. To facilitate the description of the invention, therefore, two types of knots are defined. The term 'pose' knot is adopted to identify a (spline) knot where a flip or axis reversal occurs, and the term 'timing' knot is adopted to refer to a knot where no change or flipped state occurs. In the algorithm, it will be noted that, if a sequence of pose knots exist with the same value, it would be most intuitive to flip only the vertical axis on the last pose knot in the sequence.

According to the invention, a sawtooth display may be implemented as a mode in the spline evaluation display of a computer-assisted animation system that can be switched between sawtooth mode (on) or ascending mode (off), as respectively shown in FIG. 3 and FIG. 2. When turned on, the display is kept up to date by keeping the flipped state of each knot in the spline up to date using the following algorithm, expressed in pseudo code.

```
inputs: the spline, the 'flipBeforeFirstPoseKnot' setting
1. initialize 'flipped' flag to 'flipBeforeFirstPoseKnot'
2. initialize 'nextFlip' to 0
3. for every knot in the spline do
        a. if the knot is a 'pose' knot, then
                i. set 'flipped' to 'nextFlip'
                ii. toggle 'nextFlip'
        b. set knot's 'knotFlipped' flag to 'flipped'
        c. set knot's 'firstPose' to 0
4. initialize 'zeroPoint' to 0.0
5. for every knot in the spline do
        a. if the knot is a 'pose' knot, then
                i. set knot's 'firstPose' to 1
                ii. if 'flipBeforeFirstPoseKnot' is on, then
                        1. set 'zeroPoint' to (2 * knot value)
                iii. break out of for loop
6. for every knot in the spline do
        a. if the knot is a 'pose' knot, then
                i. if this is the first pose knot ('firstPose' is 1), then
                        1. set 'zeroPoint' to 0
                ii. else, if this knot is flipped ('knotFlipped' is 1), then
                        1. add (2 * knot value) to 'zeroPoint'
                iii. else
                        1. subtract (2 * knot value) from 'zeroPoint'
        b. set the knot's 'knotZeroPoint' to 'zeroPoint'
```

Then, when displaying a spline, the y-coordinate for each knot is adjusted using the following algorithm.

```
inputs: the knot, the y-coordinate 'y', 'leftOfKnot',
'flipBeforeFirstPoseKnot'
output: the adjusted y-coordinate
```

-continued

```
1. if not in sawtooth mode, then
    a. return 'y' unchanged
2. else
    a. if 'leftOfKnot' is false
        i. set 'zeroPoint' to the knot's 'knotZeroPoint'
        ii. set 'flip' to the knot's 'flipped'
    b. else, if there is a previous knot in the spline
        i. set 'zeroPoint' to the previous knot's 'knotZeroPoint'
        ii. set 'flip' to the previous knot's 'flipped'
    c. else, if the knot is a pose knot
        i. if 'flipBeforeFirstPoseKnot' is on
                1. set 'zeroPoint' to (2 * knot value)
           ii. else
                1. set 'zeroPoint' to 0
           iii. set 'flip' to 'flipBeforeFirstPoseKnot'
    d. else,
        i. set 'zeroPoint' to the knot's 'knotZeroPoint'
        ii. set 'flip' to 'flipBeforeFirstPoseKnot'
    e. if 'flip' is set to 1
        i. return ('zeroPoint' – 'y')
    f. else
        i. return ('zeroPoint' + 'y')
```

Some implications of the sawtooth display are as follows:

If a new pose knot is inserted between two existing pose knots, all the knots following the new pose knot will flip vertically so that the sawtooth is preserved.

Tangent handles, if displayed, must be flipped only on those segments of the spline that are flipped. This can make the tangents appear broken. This is addressed by not allowing the user to break the tangents when in sawtooth mode.

Both pose knots (representing the poses of the animated object) and timing knots (representing the timing between poses) can be inserted at selected points in a spline, subject to certain constraints based on the information entry mode of interest. Pose knots can be inserted through direct manipulation or in a table of variables describing the image, but the pose knots are not insertable in a display. Timing knots can be inserted in a display or in a table. Moreover, a timing knot can be transformed into a pose knot. In split, the value of a knot represents the distance between poses and the timing knots represent the timing between the poses. The timing knots can never extend higher or lower than associated pose knots, since the only represent timing changes between poses. Likewise, pose knots can be moved in time (left or right on FIG. 2 or 3) but not in value. These features and limitations are primarily of interest to the animator user in employing the invention in creative effort, but they are not necessary limitations of the invention.

Because the present system provides an automated and integrated functionality, the inventors believe that the transformations performed by this system are much more consistent from frame to frame. Further, the inventors believe that the transformation of objects performed by this system provide a more accurate representation of real-world physics. Accordingly, the inventors believe that frames of animation including objects processed by the present system will be noticeably more realistic that was previously obtainable.

The invention has been explained with respect to specific embodiments. Other embodiments will be evident to those of ordinary skill in the art. Thus, the invention is not to be considered limited except as indicated by the appended claims.

What is claimed is:

1. A computer-implemented method for displaying animation splines, the method comprising:
   receiving a source spline formed of paths between a sequence of knots to define a path between a first end knot and a second end knot in a computer system, wherein the knots in the sequence of knots map to first axes and second axes;
   analyzing the source spline in the computer system, to identify one or more pose knots and one or more timing knots between the first end knot and the second end knot;
   thereafter determining a flipped spline in the computer system wherein second axes through at least one of the one or more pose knots are reversed; and
   displaying the flipped spline as a sawtooth spline display on a computer display of the computer system, for evaluation and to allow adjustment of the source spline by a user viewing the sawtooth spline display.

2. The method of claim 1, wherein at least one timing knot is established between successive pose knots.

3. The method of claim 1, further comprising:
   adjusting the source spline to adjust a trajectory of the source spline between the first end knot and the second end knot; and
   using the source spline to produce an animation sequence.

4. The method of claim 3, wherein adjusting the source spline comprises exaggerating anomalies in the source spline.

5. The method of claim 1, wherein the first axes represent time and the second axes represent distance.

6. The method of claim 5, wherein the second axes is a vertical display axes.

7. The method of claim 5, further comprising:
   displaying the source spline in an ascending display mode wherein successive ones of the one or more pose knots are displayed further in distance as time is advanced.

8. The method of claim 1, wherein producing the flipped spline comprises reversing the second axes of alternate ones of the one or more pose knots.

9. A computer system for displaying animation splines, the system comprising:
   a processor;
   a computer display; and
   a computer readable storage medium coupled to the processor, wherein the computer readable storage medium includes instructions stored therein for directing the processor to display animation splines, the instructions comprising:
   code for directing the processor to receive a source spline, the source spline formed of paths between a sequence of knots to define a path between a first end knot and a second end knot, the knots in the sequence of knots mapped to first axes and second axes;
   code for directing the processor to analyze the source spline to identify one or more pose knots and one or more timing knots between the first end knot and the second end knot;
   code for directing the processor to produce a flipped spline wherein second axes through at least one of the one or more pose knots are reversed; and
   code for directing the processor to display, on the computer display, the flipped spline as a sawtooth spline for evaluation and to allow adjustment of the source spline.

10. The system of claim 9, wherein at least one timing knot is established between successive pose knots.

11. The system of claim 9, further comprising:
    code for adjusting the source spline to adjust a trajectory of the source spline between the first end knot and the second end knot; and
    code for using the source spline to produce an animation sequence.

12. The system of claim 11, wherein adjusting the source spline comprises exaggerating anomalies in the source spline.

13. The system of claim 9, wherein the first axes represent time and the second axes represent distance.

14. The system of claim 13, wherein the second axes is a vertical display axes.

15. The system of claim 13, further comprising:
code for displaying the source spline in an ascending display mode wherein successive ones of the one or more pose knots are displayed further in distance as time is advanced.

16. The system of claim 9, wherein producing the flipped spline comprises reversing the second axes of alternate ones of the one or more pose knots.

17. A computer system-implemented method for displaying animation splines, the method comprising:
displaying a source spline on a computer display monitor, wherein the source spline comprises paths between a sequence of knots to define a path between a first end knot and a second end knot and wherein each knot in the sequence of knots includes first and second axes; and
determining a modified spline in the computer system in response to the source spline, wherein the second axis through at least one of the knots in the modified spline is reversed, and wherein the second axis through at least another of the knots in to modified spline is not reversed; and
displaying the modified spline on the computer display monitor;
wherein the sequence of knots include one or more pose knots and one or more timing knots, and wherein at least one timing knot is established between successive pose knots.

18. The method of claim 17, further comprising:
adjusting the source spline to adjust a trajectory of the source spline between the first end knot and the second end knot; and
using the source spline to produce an animation sequence.

19. The method of claim 18, wherein adjusting the source spline comprises exaggerating anomalies in the source spline.

20. The method of claim 17, wherein the first axis represent time and the second axis represent distance.

21. The method of claim 20, wherein the second axis is a vertical display axis.

22. The method of claim 20, further comprising:
displaying the source spline in an ascending display mode wherein successive ones of the one or more pose knots are displayed further in distance as time is advanced.

23. The method of claim 17, wherein the modified spline is produced by reversing the second axis of alternate ones of the one or more pose knots.

* * * * *